US00RE36785E

United States Patent [19]

Colson et al.

[11] E Patent Number: Re. 36,785

[45] Reissued Date of Patent: Jul. 18, 2000

[54] HIGH FAT BISCUIT MIX AND PRODUCTS RESULTING THEREFROM

[75] Inventors: Cynthia A. Colson, Chanhassen; Gregg J. Moder, Minneapolis, both of Minn.

[73] Assignee: The Pillsbury Company, Minneapolis, Minn.

[21] Appl. No.: 08/947,416

[22] Filed: Oct. 8, 1997

Related U.S. Patent Documents

Reissue of:

[64] Patent No.: 5,458,903
Issued: Oct. 17, 1995
Appl. No.: 08/363,308
Filed: Dec. 21, 1994

U.S. Applications:

[63] Continuation of application No. 08/002,320, Jan. 8, 1993, abandoned.

[51] Int. Cl.[7] ..... A21D 8/00

[52] U.S. Cl. ..... 426/551; 426/94; 426/553; 426/555; 426/556; 426/601

[58] Field of Search ..... 426/94, 551, 553, 426/555, 556, 561, 601

[56] References Cited

U.S. PATENT DOCUMENTS

| | | | |
|---|---|---|---|
| 1,117,012 | 11/1914 | Estabrook . | |
| 1,242,883 | 10/1917 | Kohman et al. . | |
| 1,370,272 | 3/1921 | Blinn . | |
| 1,417,893 | 5/1922 | Ellis . | |
| 2,392,833 | 1/1946 | Chapin . | |
| 2,499,586 | 3/1950 | Johnson . | |
| 3,039,878 | 6/1962 | Ganske . | |
| 3,212,903 | 10/1965 | Oberholtzer . | |
| 3,255,016 | 6/1966 | Parker . | |
| 3,257,213 | 6/1966 | Colby . | |
| 3,551,166 | 12/1970 | Baum et al. . | |
| 3,615,684 | 10/1971 | Workin . | |
| 3,879,563 | 4/1975 | Tucker et al. . | |
| 3,928,646 | 12/1975 | Hartley . | |
| 4,381,315 | 4/1983 | Yong et al. | 426/128 |
| 4,645,673 | 2/1987 | Wilmes . | |
| 4,761,290 | 8/1988 | Meraj et al. . | |
| 4,891,233 | 1/1990 | Belanger et al. . | |
| 5,084,288 | 1/1992 | Yamamoto et al. | 426/555 |
| 5,110,614 | 5/1992 | Corbin et al. . | |
| 5,178,893 | 1/1993 | Seewi et al. . | |
| 5,451,417 | 9/1995 | Freyn et al. | 426/551 |

*Primary Examiner*—Lien Tran
*Attorney, Agent, or Firm*—Merchant & Gould P.C.

[57] ABSTRACT

The invention is a high fat biscuit mix as well as dough and biscuit products resulting therefrom. The mix comprises flour, a leavening agent, and emulsifier along with a protein supplement and shortening. The shortening has a high initial solids content at low temperatures (50° F.) and a melting point of 104° F. or less resulting in a biscuit product having an improved moistness, flakiness and uniform height. The protein supplement and emulsifier generally provide a product having an improved outer crust layer, improved height and shape, and an interior which is tender without being doughy. The mix and resulting dough comprise a high concentration of fat and further a high concentration of fat contributed by shortening chips within the dough.

69 Claims, 1 Drawing Sheet

HIGH FAT BISCUIT MIX AND PRODUCTS RESULTING THEREFROM

Matter enclosed in heavy brackets [ ] appears in the original patent but forms no part of this reissue specification; matter printed in italics indicates the additions made by reissue.

This is a continuation of application Ser. No. 08/002,320, filed Jan. 8, 1993 *now abandoned*.

FIELD OF THE INVENTION

The invention relates generally to dry flour mixes having high concentrations of shortening, as well as dough and baked products resulting therefrom. More specifically, the invention relates to dry flour mixes comprising shortening having a reduced melting point and specific SFI profile combined with protein supplement and emulsifier.

BACKGROUND OF THE INVENTION

Dry mix flours comprising fats, shortenings, and other lipid sources, for use in the preparation of tender cooked bakery products have been well documented in the art. For example, Estabrook et al, U.S. Pat. No. 1,117,012 discloses a mixture of wheat flour with comminuted hardened oil useful in the manufacture of biscuits. Ellis, U.S. Pat. No. 1,417,893 discloses an oil product comprising paraffin oil and cotton oil having a melting point of about 60° C. for use in baking preparations such as cakes or biscuits which may include flour or other perishable ingredients. Chapin, U.S. Pat. No. 2,392,833 discloses a comminuted shortening product comprising any number of oils, such as cotton seed oil, corn oil, peanut oil, sunflower oil, and the like combined with colloidal agents useful in the emulsification of fat, and ultimately for inclusion into baking products such as breads, cakes, donuts,, and the like. Oberholtzer, U.S. Pat. No. 3,212,903 discloses a frozen biscuit dough prepared with coagulated vegetable oil in the form of a salad dressing-type material, that is an emulsion such as mayonnaise.

Further, Colby, U.S. Pat. No. 3,257,213 discloses a flour mix containing autonomous particles of shortening which are encapsulated so as to allow for a free-flowing flour. Hartley, U.S. Pat. No. 3,928,646 discloses a process where the blending of temperature-sensitive constituents, such as flour, salt, milk, sugar, and the like with shortening agents to provide a manufacturable dough. Wilmes, U.S. Pat. No. 4,645,673 discloses a frozen pizza dough having a mixture of high protein and low protein wheat flours and containing a flaked solid fat constituent of specific dimensions. The disclosed fat pieces having a melting point ranging from about 118° to 128° F. Meraj et al, U.S. Pat. No. 4,761,290 discloses dough products which are produced by applying shortening flakes to a dough and then coating the dough with a light batter. Belanger et al, U.S. Pat. No. 4,891,233 discloses flakes of baking shortening or lard useful in the formulation of pie crust doughs.

Also noteworthy, Tucker et al, U.S. Pat. No. 3,879,563 discloses a refrigerated biscuit dough comprising a shortening which has a solids to fat index allowing for the retention of a certain percentage of solid shortening at temperatures in excess of 120° F. However, of total shortening concentration, Tucker et al teaches at the most 50% in the form of chips and, at most, 12 wt-% of the total formulation. Parker, U.S. Pat. No. 3,255,016 discloses a pastry dough comprising shortening present in the dough in discrete cubes, the shortening generally comprising cotton seed oil and oleostearin.

However, the compositions disclosed above generally use a shortening composition which has a lower initial solids concentration at 50° F. or a melting point far in excess of that necessary to provide a bakery product which has uniform physical proportions, as well as the desired texture, and palatability. The result is a Solid Fat Index (SFI) which has a flatter slope or a higher melting point.

Prior art dough products generally cannot prevent tilting of the baked product while baking, particularly in a high air velocity oven. The tilt is generally due to the inability to control the height of the product. Usually the side of each product that is towards the center of the baking sheet will rise more quickly than the side that is away from the sheet center during baking. This uneven rise during baking causes the product to have a tilted appearance which is not pleasing to the consumer. Consumers generally desire baked products such as biscuits to have a uniform appearance, for example, uniform height, circumference, as well as a browned outer layer and tender interior.

Many factors have combined to result in dough products which are difficult to produce in a storage stable form and ultimately used to provide a baked product having a uniform physical appearance as well as the appropriate interior texture, exterior crispy layer, and taste.

Accordingly, a need exists to provide a dough mix and refrigerated dough product which will provide a biscuit or other baked good product having a uniform physical appearance as well as a pleasing taste and texture.

SUMMARY OF THE INVENTION

In accordance with a first aspect of the invention, there is provided a dry flour mix for use in the manufacture of high fat baked products comprising flour, a leavening agent, emulsifier, an amount of protein source effective to provide a bakery product having a crisp outer layer and a tender, flaky interior and shortening wherein the shortening is present in a concentration which provides a mix resulting in a dough product of uniform baking properties and composition.

In accordance with a further aspect of the invention, there is provided a high-fat dough made from the dry flour mix of the invention. In accordance with an even further aspect of the invention, there is provided a prebaked high fat biscuit made from the dough of the invention.

The invention is a bakery mix, dough product, and prebaked bakery product. In the context of this invention, prebaked indicates a product which has been baked and then frozen or refrigerated prior to warming and eating. Applicants have found that the addition of higher amounts of fat into a dough without deleterious effects is accomplished by using fats with a higher initial solids content (about 61 percent at 50° F.) and a melting point around 90° to 104° F.

The fat defined by these [perimeters] *parameters* can be in the form of a plastic, chip, or noodle or any combination thereof. The use of fats with the specified initial solids content and melting point results in an improved high fat biscuit. The amount of this fat added to the dough composition can be as high as about 28 wt-% of the dough composition. The higher fat doughs have been found useful after freezing as well as when they are baked fresh.

The purpose of the invention is to improve the texture and appearance of frozen prepared dough products such as biscuits. There is an ongoing and growing demand for frozen prepared dough products from retail restaurants producing ready-to-serve food items. These restaurants bake these products for sale to the fast-food consumer. The flakiness of the crumb, oil content or moistness of the product, the height and slant of the product, and the ability to withstand infrared lights are all important criteria, which the frozen prepared dough products must satisfy.

The flakier the crumb of the product, the more it seems like it has been freshly prepared at the sight of distribution. The more moist and oiler the product, the more appealing it is to the final consumer from the standpoint of taste and texture. The length of time the product can withstand the infrared lights without drying indicates the shelf life at the fast-food restaurant. The height and tilt of the product are also very important to its aesthetic appearance and consumer satisfaction.

With the invention, the prepared dough products are more moist and have a flakier crumb, less tilt, and a longer shelf life. The products with this new formulation have a fast-food shelf life of 60 to 90 minutes as compared to products of the prior art which have a shelf life of appreciably less than 60 minutes under infrared lights before becoming dry in the center. Moreover, the products with the new formulation emerge from the oven with a crisp and glossy crust.

DETAILED DESCRIPTION OF THE PREFERRED EMBODIMENT

Figure 1:
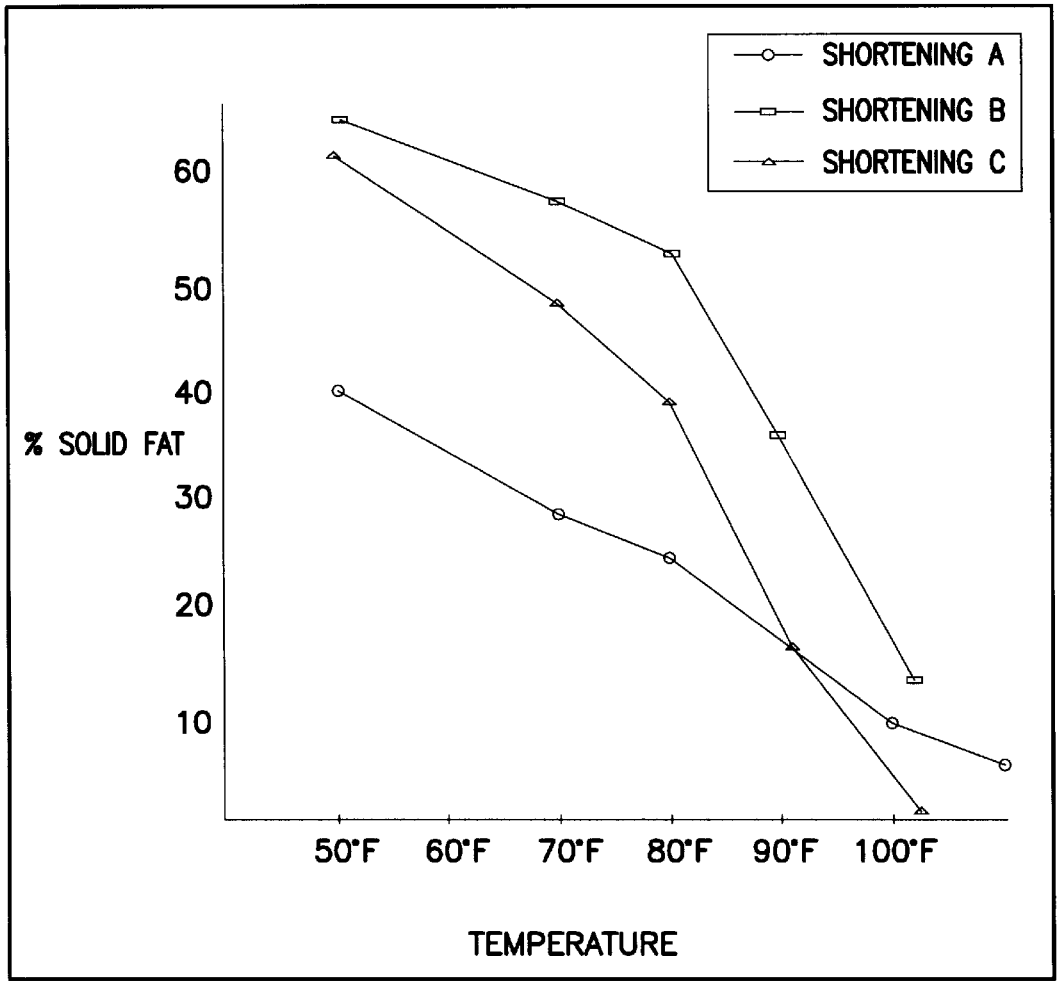
FIG. 1 is a graphical depiction of the SFI profile of the shortening composition used in accordance with the composition of the invention.

The invention is a dry flour mix for use in the manufacture of doughs and biscuits comprising flour, a leavening agent, a protein source, and shortening.

Shortening

The invention comprises a shortening constituent or composition. Generally, Applicants have found that a shortening of specific composition when included into a dry biscuit mix and, ultimately, dough and biscuit, provides a biscuit which provides for uniform physical proportion that has less tilt with appreciably greater rise. The shortening acts to lengthen the period of gas retention within the biscuit dough so as to allow for a more uniform gas retention and oven rise within the dough product during cooking.

Shortening is generally comprised of fats and fatty oils, which are made of predominantly triesters of glycerol with fatty acids, commonly called triglycerides. The number of triglycerides in a given natural fat is a function of the number of fatty acids present and specificity of the enzyme systems involved in that particular fat-synthesis reactions.

Fats and fatty oils useful in producing shortening consistent with the invention include cotton seed oil, ground nut oil, soybean oil, sunflower oil, rape oil, sesame oil, olive oil, corn oil, safflower oil, palm oil, palm kernel oil, coconut oil, and combinations thereof. Preferably, the shortening used in the composition of the invention comprises soybean oil and cotton seed oil at concentrations ranging from about 95 wt-% to 60 wt-% (soybean oil), and 5 wt-% to 30 wt-% (cotton seed oil), preferably about 85 wt-% to 75 wt-% (soybean oil), and about 15 wt-% to 25 wt-% (cotton seed oil).

We have found that at a given solids content, an abundance of small crystals produces a harder fat than do coarse crystals. We have also found that large soft crystals are typically produced by slow cooling. We have also found that crystallized fats are generally thixotropic and become softer after vigorous agitation or stress resulting from, for example, shearing or mixing.

The shortening used in the invention function to provide the enhanced palatability, physical texture, physical form, and overall aesthetic appeal to the baked product. Generally, the shortening provides a tender, soft, fluffy mouthfeel having a light, flaky texture, while at the same time providing an outer crust having a crisp texture and glossy appearance. The shortening also preferably provides for the attainment of pronounced leavening or height in the baked good with minimal tilting or slanting of the top crust. Generally, the height in a biscuit product will vary depending on the weight and diameter of the biscuit. For example, in a biscuit weighing about 60 grams (as dough) with a diameter of about 2.75 inches, the resulting height in the cooked biscuit will range from about 3.4 cm to 4.5 cm, and preferably as high as 4.5 cm.

To this end, any number of shortening compositions and physical states (including liquid, semisolid, or solid) as well as physical forms may be used. Forms including plasticized shortening, chip shortening, and noodle-shaped shortening may all be used. The shortening may also comprise a mixture of physical forms. As can be seen below in Table 1, the shortening chip physical form may be used given the following parameters.

TABLE 1

| | Useful | Working | Preferred |
|---|---|---|---|
| Chip Area ($mm^2$) | 40–370 | 75–300 | 75–180 |
| Chip Concentration (Wt-% of Shortening) | | | |
| Embodiment I | 30–100 wt-% | 40–60 wt-% | 45–66 wt-% |
| Embodiment II | 70–100 wt-% | 80–100 wt-% | 90–100 wt-% |
| Chip Thickness (cm) | 0.08–0.2 | 0.125–0.175 | 0.14–0.16 |

As can be seen, depending upon the desired biscuit qualities, as much as 100 wt-% of the shortening may be composed of chips. Plasticized shortening may also be used if processing equipment permits, for example extrusion. Notably, shortening in the form of chips provides for less tilting in the upper surface of the baked product. Tilt is generally considered to be the difference in the height of a baked product across its upper surface when measured at the outer edge of the upper surface between the lowest point and the highest point of the upper surface. For example, in a 60 gram biscuit (as dough) with a height about 4.0 centimeters, the tilt will range from about 0.5 cm to 1.5 cm and preferably 0.5 cm. This range of tilt will be prevalent regardless of height with the understanding that less height provides a lower incidence of tilt. Using chip shortening at levels approaching 100 wt-% of total shortening provides interior flakiness to the baked product while also providing an outer crust which is tender yet crisp.

The shortening may also take the form of ribbons or cylindrical noodles which may be added or otherwise used in accordance with the parameters found in Table 2.

TABLE 2

| | Useful | Working | Preferred |
|---|---|---|---|
| Diameter (Inches) | ⅛–⅜ | ¼–⅜ | ¼ |
| Noodles Concentration (As a Precent of Shortening) | 0–100% | 0–80% | 0–50% |

The noodles can be used to moderate the attributes provided by the chips to the baked product. If the noodles are cooled and handled properly they may even be used to emulate the properties provided by the chips.

For example, hardened plastic shortening may be extruded through a pipe using [of] a Graco pump having a die used to form shortening noodles or pellets of a specific diameter. We have found that in extrusion, the less shear in this process, the better to provide a hardened shortening.

The noodles or pellets may then be added to the mixer along with the other dry ingredients. Generally, it is preferred that dough temperature be less than 75° F. with 60° F. being preferred. Noodle diameter can range from about ⅛" to ⅜". Lengths may vary around about one inch as the sticks or noodles are broken up in smaller chunks during the mixing and dry blending processes.

Preferably, the shortening constituent in the first preferred embodiment of the invention comprises about 50 wt-% of chip shortening as a percentage of total shortening having a melting point of 104° F. or less and preferably 102° F. The SFI profile for this product may be seen in FIG. 1 as shortening C (consistent with Working Examples 2–11). The other 50 wt-% of the shortening preferably comprises a plasticized shortening seen in FIG. 1 as shortening A (consistent with Working Examples 2–11) having the SFI profile depicted.

In the second preferred embodiment of the invention, the shortening comprises as much as 100 wt-% of chip shortening C (consistent with Working Examples 2–11) and with the SFI profile depicted in FIG. 1. This shortening has a melting point of preferably less than 104° F. and an SFI profile which has a slope for the preferred shortening generally ranges between −1.5 and −0.5 between 50° F. and 80° F., and −2.0 and −0.5 between 80° F. and 104° F., and preferably between −0.6 and −0.8 between 50° F. and 80° F. and −1.5 and −1.7 between 80° F. and 104° F. The preferred slope at 50° F. to 80° F. is about −0.70 and from 80° to 104° about −1.58. Overall, the shortening preferably has a slope of about −0.9 or greater, preferably −0.95 or greater, and most preferably about −0.975 or greater in slope.

The Protein Supplement

In the preparation of dry mix as well as wet doughs for use in the preparation of biscuits, we have found that the addition of proteins including dairy proteins and milk solids substantially increases the ability to obtain biscuits having a crisp, brown outer surface as well as a biscuit having a tender interior which is moist but not doughy. Generally, proteins which may be used include any proteins or solids which provide the above-referenced characteristics.

Preferably, proteins which may be included in the dry mix and dough of the invention include proteins resulting from amino acids selected from the group of glycine, alanine, leucine, isoleucine, valine, phentolamine, [turicine] *Tyrosine*, tryptophan, proline, methionine, cystine, serine, threonine, asparagine, glutamine, histidine, aspartic acid, glutamic acid, lysine, and arginine.

Proteins which may result from these amino acids and found useful in the invention include α-keratin, collagen, fibroin, sclerolin, myosin, actin, carboxypeptidase, trypsin, ovalbumin, casein, and the like.

Preferably, proteins used in accordance with the invention include dairy proteins, egg proteins, and wheat proteins. Specifically preferred are dairy proteins including whey, soy protein, caseinate, as well as proteins resulting from buttermilk, buttermilk solids, and non-fat dry milk. Also useful are egg proteins such as albumin as well as wheat proteins such as those derived from flour or gluten. The most preferred protein supplements comprise caseinate, albumens, whey protein concentrate, non-fat dry milk, and buttermilk, among others.

The Mix and Dough

The composition of the invention generally comprises a mix, which may be made into a dough formulated from the mix. The mix acts as a low bulk agent, almost a premix, for delivering the various agents to the dough. The dough may be formulated from the mix through any number of means known to those of skill in the art including that disclosed in U.S. Pat. No. 3,879,563 which is incorporated herein by reference. The dough acts to provide physical stability to the food-stuff while also providing the necessary consistency and thermal stability for a food-stuff which is first baked and then refrigerated or frozen before reheating. Additionally, the dough provides a medium which is preferably compatible with any other food stuff or topping with which it may be combined and is physically adequate to support and deliver [and] any other food stuff or topping.

The mix and dough may comprise any number of constituents consistent with this function. Generally, the dough of the invention comprises a processed or unprocessed flour which may either be a white flour or a whole grain constituent. Grains useful for defining the dough of the invention include grain constituents such as flours, germ, and brand from wheats, oats, rye, sorghum, barley, rice, millet, and corn among others.

Additionally, the dough of the invention may also comprise water. Water function to assist in melting the proteins, provides vapor for leavening, and generally provides a formulatory medium for solubilizing and activating the various constituents of the mix.

Along with other constituents, the mix and the dough of the invention may also comprise a leavening agent. Leavening agents useful in the invention include air, steam, yeast, and baking powder such as those containing sodium bicarbonate and the combination of one or more baking acids with sodium bicarbonate. Baking acids useful for chemical leavening and dough mixtures include monocalcium phosphate monohydrate, sodium aluminum sulfate, sodium acid pyrophosphate, sodium aluminum phosphate, dicalcium phosphate, glucano-deltalactone, potassium hydrogen tartrate, and mixtures thereof. One or more baking acids may be combined with the sodium bicarbonate to form the chemical leavening agent. Preferably, the dough of the invention comprises from about 0.7 wt-% to 1.5 wt-% sodium bicarbonate.

The invention may also comprise an emulsifier. Generally, the emulsifier functions with the shortening and protein supplement to reduce doughiness in the interior of the baked product and provide a crisp outer crust. The emulsifier, along with protein and shortening, provides an appealing tender texture to the interior portion of the baked product. Emulsifiers may also be incorporated into the dough to influence texture of homogeneity of the dough mixture, to increase dough stability, to improve eating quality, and to prolong palatability. Emulsifying agents which may be used include mono- and diglycerides of fatty acids, propylene glycol mono- and di-esters of fatty acids, glycerol-lactose esters of fatty acids, ethoxylated or succinylated mono- and diglycerides, lecithin, diacetyl tartaric acid esters or mono- and diglycerides, sucrose esters of glycerol, or equivalents thereof and mixtures thereof. Emulsifying agents may be used singly or in combination. Preferred emulsifiers include mixtures of diacetyl tartaric acid esters, and succinylated mono- and diglycerides. The mix and dough of the invention may also comprise any number of other constituents as known to those of skill in the art including sugar, salt, dyes, flavorants, and other constituents.

Enrichment nutrients which may be added to the dough may include thiamine, riboflavin, niacin, iron, calcium, and mixtures thereof. Other ingredients which may be optionally added to the dough mixture include dough seasonings, extenders, preservatives, and food colorings as desired.

The invention is a mix, dough, and resulting biscuit. The dough may be baked to provide a bakery product which is ready to serve or prebaked to provide a bakery product which is first refrigerated or frozen and then reheated for serving.

Generally, apart from flavorings such as sugar, and salts among other constituents, the concentrations of the various constituents found in the mix, dough, and biscuits may be found below in Table 3.

TABLE 3

| | Formulations (Wt-%) | | |
|---|---|---|---|
| | Useful | Working | Preferred |
| Biscuit Mix | | | |
| Flour | 50–85 | 55–80 | 60–75 |
| Protein Supplements | 0.5–5 | 1.25–4 | 2.5–4 |
| Shortening | 10–40 | 15–35 | 20–35 |
| Leavening Agents | 2–6 | 3–5 | 4–5 |
| Emulsifier | 0–3 | 0–2.0 | 0.7–1.2 |
| Biscuit Dough | | | |
| Flour | 35–60 | 35–55 | 40–50 |
| Protein Supplements | 0.5–4 | 1.5–3.5 | 2–3 |
| Shortening | 7–28 | 10–24 | 14–24 |
| Leavening Agents | 1–4.5 | 1.5–3.5 | 2.0–3.2 |
| Emulsifier | 0–2 | 0–1.5 | 0.5–0.9 |
| Liquids (Water/Milk) | 20–40 | 24–35 | 28–32 |
| Prebaked Biscuits | | | |
| Flour | 38–65 | 40–60 | 45–55 |
| Leavening Agents | 1–4.5 | 1.5–3.5 | 2–3.2 |
| Shortening | 7–28 | 10–24 | 14–24 |
| Protein Supplements | 0.5–4 | 1–3 | 1.5–3 |
| Liquids (Water/Milk) | 15–35 | 20–35 | 20–30 |
| Emulsifiers | 0–2 | 0–1.5 | 0.6–1.5 |

Working Examples

The following examples further illustrate the invention. They are not meant to constitute implied or express limitations of the scope which is filly set forth in the foregoing text.

Working Examples 1–10

Compositions Were Then Formulated Using Various Shortening Compositions.

| | Shortening Constituent | | | |
|---|---|---|---|---|
| Working Examples | A* | B** | C*** | D**** |
| 1 (Control) | | (30) 5.20% | | (70) 12.10% |
| 2 | | (40) 6.92%% | | (60) 10.38% |
| 3 | (70) 12.10% | (30) 5.20% | | |
| 4 | (60) 10.38% | (40) 6.92% | | |
| 5 | (60) 9.60% | (40) 6.40% | | |
| 6 | (50) 8.65% | (50) 8.65% | | |
| 7 | (60) 10.38% | | (40) 6.92% | |
| 8 | (50) 8.65% | | (50) 8.65% | |
| 9 | (40) 6.92% | | (60) 10.38% | |
| 10 | (30) 5.20% | | (70) 12.10% | |

Total Shortening in Each Example = 17.30%

*Anderson-Clayton (soybean/cotton seed oil) shortening available under Product Code No. 635 (SFI = 50° F., 39.5% ± 0.4% solids; 70° F., 28% ± 3.5; 80° F., 24.5% ± 2.5; 92° F. 15% ± 2; 100° F., 9% ± 2; 100° F., 5% MAX)

**Anderson-Clayton (100% soybean oil) shortening available under Product Code No. 858 (SFI = 50° F., 65% ± 3; 70° F., 57% ± 3; 80° F., 53% ± 3; 92° F., 36% 3; 104° F., 13% MAX)

***Anderson-Clayton (soybean/cotten seed oil (20 wt-%)) available under Produce Code No. 1510 (SFI = 50° F., 61% ± 3; 70° F., 48% ± 3; 80° F., 39% ± 3; 92° F., 16.5% ± 3; 104° F., 1.5% MAX)

****Same as in Shortening C in a cubed form which is extruded before processing.

Working Example 1

| Working Example 1 | |
|---|---|
| Ingredient | Percent (Wt-%) |
| Hard Flour | 11.11 |
| Soft Flour | 33.00 |
| Water | 29.15 |
| Shortening (Plastic) | 12.10 |
| Shortening Chip | 5.20 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |
| Caseinate | 0.40 |
| Dairy Flavor | 0.20 |

Working Example 2

| Working Example 2 | |
|---|---|
| Ingredient | Percent (Wt-%) |
| Hard Flour | 11.11 |
| Soft Flour | 33.00 |
| Water | 29.15 |
| Shortening (Plastic) | 10.38 |
| Shortening Chip | 6.92 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |
| Caseinate | 0.40 |
| Dairy Flavor | 0.20 |

Working Example 3

| Working Example 3 | |
|---|---|
| Ingredient | Percent (Wt-%) |
| Hard Flour | 11.11 |
| Soft Flour | 33.00 |
| Water | 29.15 |
| Shortening (Plastic) | 12.10 |
| Shortening Chip | 5.20 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |
| Caseinate | 0.40 |
| Diary Flavor | 0.20 |

Working Example 4

| Working Example 4 | |
|---|---|
| Ingredient | Percent (Wt-%) |
| Hard Flour | 11.11 |
| Soft Flour | 33.00 |
| Water | 29.15 |
| Shortening (Plastic) | 10.38 |
| Shortening Chip | 6.92 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |
| Caseinate | 0.40 |
| Diary Flavor | 0.20 |

-continued

| Working Example 4 | |
|---|---|
| Ingredient | Percent (Wt-%) |
| Phosphate | |
| Sugar | 1.24 |
| Corn Solids | 0.74 |
| Salt | 0.99 |
| Albumen | 0.30 |
| Caseinate | 0.40 |
| Diary Flavor | 0.20 |

Working Example 5

| Working Example 5 | |
|---|---|
| Ingredient | Percent (Wt-%) |
| Hard Flour | 11.31 |
| Soft Flour | 33.59 |
| Water | 29.66 |
| Shortening (Plastic) | 9.60 |
| Shortening Chip | 6.40 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |
| Caseinate | 0.40 |
| Diary Flavor | 0.20 |

Working Example 6

| Working Example 6 | |
|---|---|
| Ingredient | Percent (Wt-%) |
| Hard Flour | 11.11 |
| Soft Flour | 33.00 |
| Water | 29.15 |
| Shortening (Plastic) | 8.65 |
| Shortening Chip | 8.65 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |
| Caseinate | 0.40 |
| Diary Flavor | 0.20 |

Working Example 7

| Ingredient | Percent (Wt-%) |
|---|---|
| Hard Flour | 11.11 |
| Soft Flour | 33.00 |
| Water | 29.15 |
| Shortening (Plastic) | 10.38 |
| Shortening Chip | 6.92 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |
| Caseinate | 0.40 |
| Diary Flavor | 0.20 |

Working Example 8

| Ingredient | Percent (Wt-%) |
|---|---|
| Hard Flour | 11.11 |
| Soft Flour | 33.00 |
| Water | 29.15 |
| Shortening (Plastic) | 8.65 |
| Shortening Chip | 8.65 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |
| Caseinate | 0.40 |
| Diary Flavor | 0.20 |

Working Example 9

| Ingredient | Percent (Wt-%) |
|---|---|
| Hard Flour | 11.11 |
| Soft Flour | 33.00 |
| Water | 29.15 |
| Shortening (Plastic) | 6.92 |
| Shortening Chip | 10.38 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |

-continued

| Ingredient | Percent (Wt-%) |
|---|---|
| Caseinate | 0.40 |
| Dairy Flavor | 0.20 |

Working Example 10

| Ingredient | Percent (Wt-%) |
|---|---|
| Hard Flour | 11.11 |
| Soft Flour | 33.00 |
| Water | 29.15 |
| Shortening (Plastic) | 5.19 |
| Shortening Chip | 12.11 |
| Buttermilk | 2.97 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.30 |
| Caseinate | 0.40 |
| Dairy Flavor | 0.20 |

To decrease the tilt and control the height of the biscuits, a blend of chips and plastic shortening was used. The best product was Working Example 8, which maintained texture and appearance. This blend of plastic and chip [shorting] *shortening* reduced tilt without creating a pasty or greasy texture. Comments on various runs of the working examples may be found below in Table 4.

TABLE 4

| Working Example | Comment | Height | Tilt |
|---|---|---|---|
| 3 | Very little blow out, very good appearance, just slightly dry | 4.08 | .83 |
| 4 | Minimal blow out, slightly more tilt, appearance, more moist, tender | 4.23 | .88 |
| 5 | O.K. appearance, eats pasty and slightly doughy | 4.16 | 1.2 |
| 6 | Appearance O.K., eats O.K. | 4.22 | 1.05 |
| 7 | Has more blow out in rebake, slightly smooth crust | 4.08 | 1.9 |
| 8 | Better appearance than Working Example 3 | 4.22 | 1.2 |
| 9 | Some blow out, eats greasier | 4.2 | 1.33 |
| 10 | Looks better than Working Example 5, eats greasy | 4.12 | 1.55 |
| 9 | Some blow out, eats heavy and greasy | 4.08 | .92 |
| 10 | Crust color gets too dark, spotty, eats very greasy, pasty | 3.87 | 1.18 |

The preferred shortening is the 50/50 blend of shortening (soft) and chips both C and A shortenings of Example 8. This shortening mixture (shortenings C and A) are the closest to Working Example 2 which is composed of shortenings D and B.

Working Example 11 (Wt-%)

| Ingredient | |
|---|---|
| Flour | 33.08 |
| Water | 31.16 |
| Hydrogenated Vegetable Shortening | 16.5 |
| Flour | 8.17 |
| Buttermilk Solids Extra Grade | 2.88 |
| Granulated Sugar | 1.75 |
| Bicarbonate of Soda Fine Granular | 1.4 |
| Salt, Medium Fine (Unfilled) | 1.03 |
| Sodium Aluminum Phosphate | 1.0 |
| Sodium Caseinate (Milk Protein) | 0.9 |
| Diacetyl Tartaric Acid Esters of Diglycerides | 0.8 |
| Sodium Acid Pyrophosphate | 0.6 |
| Albumen | 0.4 |
| Enzyme Modified Butter Flavor | 0.24 |
| Canola Oil | 0.08 |

The resulting biscuit products proved to have a mild buttermilk flavor, normal fluffiness, medium to high doughiness, normal crispness, medium to high moisture, and heights ranging from 3.7 cm to 4.3 cm from dough compositions of about 60 grams. The tilt in the biscuits ranged from about 0.5 to 1.0 mm. Working Example 5 is somewhat "more cracker like", lighter and slightly dryer than the products made with the hard chip C. Working Example 8 is a "richer", heavier, just slightly greasy, and maintains good tilt with minimal blow out or side wall erosion.

Working Example 12

| Ingredient | Percent (Wt-%) |
|---|---|
| Hard Flour | 22.00 |
| Soft Flour | 22.00 |
| Water | 29.26 |
| Shortening (Plastic) | 10.38 |
| Shortening Chip | 6.92 |
| Buttermilk | 2.47 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.00 |
| Caseinate | 1.20 |
| Dairy Flavor | 0.20 |

Working Example 13

| Ingredient | Percent (Wt-%) |
|---|---|
| Hard Flour | 20.00 |
| Soft Flour | 20.00 |
| Water | 29.26 |
| Shortening (Plastic) | 5.00 |
| Shortening Chip | 8.00 |
| Buttermilk | 1.27 |
| Soda | 1.09 |
| Sodium Acid Pyrophosphate | 0.88 |
| Sodium Aluminum Phosphate | 0.44 |
| Mono Calcium Phosphate | 0.19 |
| Sugar | 1.24 |
| Corn Solids | 0.74 |
| Salt | 0.99 |
| Albumen | 0.00 |
| Caseinate | 1.00 |
| Dairy Flavor | 0.20 |

Working Example 14

| Ingredient | Percent (Wt-%) |
|---|---|
| Hard Flour | 12.00 |
| Soft Flour | 33.15 |
| Water | 27.69 |
| Shortening (Plastic) | 8.55 |
| Shortening Chip | 8.65 |
| Buttermilk | 2.97 |
| Soda | 1.35 |
| Sodium Acid Pyrophosphate | 1.09 |
| Sodium Aluminum Phosphate | 0.62 |
| Sugar | 1.34 |
| Corn Solids | 0.50 |
| Salt | 0.90 |
| Albumen | 0.30 |
| Caseinate | 0.60 |
| Dairy Flavor | 0.20 |
| Canola Oil | 0.07 |

The above specification, examples and data provide a complete description of the manufacture and use of the composition of the invention. Since many embodiments of the invention can be made without departing from the spirit and scope of the invention, the invention resides in the claims hereinafter appended.

I claim:

1. A dry flour mix *suitable for making a biscuit product*, said mix comprising flour, a leavening agent, salt, an amount of an emulsifier effective to reduce the doughiness in the interior of the [baked] *biscuit* product and provide a crisp outer crust, an amount of protein source effective to provide [a] *the* biscuit [having] *with* a crisp outer layer and a tender interior and a shortening constituent, wherein said shortening constituent comprises a shortening having a melting point of about 104° F. or less, an SFI profile which has a slope of about −0.9 or greater and is present in a concentration which provides a mix resulting in a dough product of uniform baking properties and composition.

2. The mix of claim 1 wherein said shortening is present in a concentration ranging from about 10 wt-% to 40 wt-%.

3. The mix of claim 2 wherein said shortening is present in a physical form selected from the group consisting of chips, noodles, plasticized shortening, or mixtures thereof.

4. The mix of claim 3 wherein said shortening comprises chips having a thickness ranging from about 0.08 cm to 0.2 cm.

5. The mix of claim 1 wherein said protein [supplement] *source* is present in a concentration ranging from about 0.5 wt-% to 5 wt-%.

6. The mix of claim 5 wherein said protein source comprises caseinate in a concentration ranging from about 1.25 wt-% to 4 wt-%.

7. A dough resulting from the mix of claim 6.

8. A high fat dough *suitable for making a biscuit product*, said dough comprising water, flour, a leavening agent, salt, an amount of protein source effective to provide [a] *the* biscuit [having] *product with* a crisp outer layer and a tender interior and a shortening constituent, an amount of emulsifier effective to reduce the doughiness in the interior of the [baked] *biscuit* product and provide a crisp outer crust, wherein said shortening constituent comprises a shortening having a melting point of about 104° F. or less, an SFI profile which has a slope of about −0.9 or greater and is present in a concentration which provides [a mix resulting in a] *the* dough [product of] *with* uniform baking properties and composition.

9. The dough of claim 8 wherein said shortening is present in a concentration ranging from about 7 wt-% to 28 wt-%.

10. The dough of claim 9 wherein said shortening is present in a physical form selected from the group consisting of ribbons, chips, plasticized shortening, and mixtures thereof.

11. The dough of claim 10 wherein said shortening comprises chips having a thickness ranging from about 0.08 cm to 0.2 cm.

12. The dough of claim 8 wherein said protein [supplement] *source* is present in a concentration ranging from about 0.5 wt-% to 4 wt-%.

13. The dough of claim 12 wherein said protein [supplement] *source* comprises caseinate in a concentration ranging from about 1.5 wt-% to 3.5 wt-%.

14. A biscuit resulting from the dough of claim 13.

15. A high fat [bakery] *biscuit* product, said [bakery] *biscuit* product *made from a dough, said dough* comprising flour, a leavening agent, salt, an amount of protein source effective to provide [a] *the* biscuit [having] *product with* a crisp outer layer and a tender interior and a shortening constituent, an amount of emulsifier effective to reduce the doughiness in the interior of the [baked] *biscuit* product and provide a crisp outer crust, wherein said shortening constituent comprises a shortening having a melting point of about 104° F. or less, an SFI profile which has a slope of about −0.9 or greater and is present in a concentration which provides [a mix resulting in a] *said* dough [product of] *with* uniform [baking] properties and composition.

16. The biscuit of claim 15 wherein said shortening is present in a concentration ranging from about 7 wt-% to 28 wt-%.

17. The biscuit of claim 16 wherein said shortening is present in a physical form selected from the group consisting of ribbons, chips, plasticized shortening, and mixtures thereof.

18. The biscuit of claim 15 wherein said protein source is present in a concentration ranging from about 0.5 wt-% to 4 wt-%.

19. The biscuit of claim 18 wherein said protein source comprises caseinate in a concentration ranging from about 1.5 wt-% to 3.5 wt-%.

20. A frozen biscuit dough composition comprising by weight:

a. from about [43] *35* percent to about [63] *60* percent farinaceous material [having a protein content of from about 0.5 wt-% to about 4 wt-%];

b. from about 7 wt-% to about 28 wt-% shortening, wherein said shortening is comprised of from about 40 percent to about 100 percent shortening flakes, said shortening flakes having solids fat index values of about 61 at 50° F., about 48 at 70° F., and 39 at 80° F., about 16.5 at 92° F., and about 1.5 at 104° F.

c. from about 20 wt-% to about 40 wt-% liquids;

d. from about 1 wt-% to about 4.5 wt-% leavening agent;

e. from about [0.5] *0.3* wt-% to about 2 wt-% emulsifying agent; and f. from about 0.5 wt-% to about 4 wt-% protein [supplement] *source*.

21. The frozen biscuit dough composition of claim 20 wherein said shortening flakes have a melting point of about 104° F.

22. The frozen biscuit dough composition of claim 20 wherein said emulsifying agent comprises diacetyl tartaric acid esters of mono- and diglycerides.

23. The frozen biscuit dough composition of claim 20 wherein said shortening is comprised of about 100 percent shortening flakes.

24. The [composition] *mix* of claim 1, wherein said emulsifying agent is selected from the group consisting of a monoglyceride of a fatty acid, a diglyceride of a fatty acid, propylene glycol, a mono ester of a fatty acid, a diester of a fatty acid, a glycerol ester of a fatty acid, a lactose ester of a fatty acid, an ethoxylated monoglyceride, an ethoxylated diglyceride, a succinylated monoglyceride, a succinylated diglyceride, lecithin, a diacetyl tartaric acid ester of a monoglyceride, a diacetyl tartaric acid ester of a diglyceride, a sucrose ester of glycerol, and mixtures thereof.

25. The [composition] *mix* of claim 24, wherein said emulsifying agent is present in a concentration ranging from about 0.7 to 1.2 wt-%.

26. The [composition] *dough* of claim 8, wherein said emulsifying agent is selected from the group consisting of a monoglyceride of a fatty acid, a diglyceride of a fatty acid, propylene glycol, a mono ester of a fatty acid, a diester of a fatty acid, a glycerol ester of a fatty acid, a lactose ester of a fatty acid, an ethoxylated monoglyceride, an ethoxylated diglyceride, a succinylated monoglyceride, a succinylated diglyceride, lecithin, a diacetyl tartaric acid ester of a monoglyceride, a diacetyl tartaric acid ester of a diglyceride, a sucrose ester of glycerol, and mixtures thereof.

27. The [composition] *dough* of claim 26, wherein said emulsifying agent is present in a concentration ranging from about 0.5 to 0.9 wt-%.

28. The [composition] *biscuit product* of claim 15, wherein said emulsifying agent is selected from the group consisting of a monoglyceride of a fatty acid, a diglyceride of a fatty acid, propylene glycol, a mono ester of a fatty acid, a diester of a fatty acid, a glycerol ester of a fatty acid, a lactose ester of a fatty acid, an ethoxylated monoglyceride, an ethoxylated diglyceride, a succinylated monoglyceride, a succinylated diglyceride, lecithin, a diacetyl tartaric acid ester of a diglyceride, a diacetyl tartaric acid ester of diglyceride, a sucrose ester of glycerol, and mixtures thereof.

29. The [composition] *biscuit product* of claim 15, wherein said emulsifier is present in a concentration ranging from about 0.6 to 1.5 wt-%.

30. The mix of claim 1 wherein said shortening is in the form of a chip having an area ranging from about 40 to 370 $mm^2$.

31. The [composition] *dough* of claim 8 wherein said shortening is in the form of a chip having an area ranging from about 40 to 370 $mm^2$.

32. The composition of claim 20 wherein said shortening is in the form of a chip having an area ranging from about 40 to 370 $mm^2$.

33. A dry flour mix suitable for making a dough which may then be made into a biscuit product, said mix comprising flour, a leavening agent, salt, an amount of protein source effective to provide the biscuit product with a crisp outer layer and a tender interior and a shortening constituent, wherein said shortening constituent comprises a shortening having a melting point of about 104° F., or less, and SFI profile which has a slope of about −0.9 or greater and is present in a concentration which provides the dough with uniform baking properties and composition.

34. The mix of claim 33 wherein said shortening is present in a concentration ranging from about 10 wt-% to 40 wt-%.

35. The mix of claim 34 wherein said shortening is present in a physical form selected from the group consisting of chips, noodles, plasticized shortening, or mixtures thereof.

36. The mix of claim 35 wherein said shortening comprises chips having a thickness ranging from about 0.08 cm to 0.2 cm.

37. The mix of claim 33 wherein said protein source is present in a concentration ranging from about 0.5 wt-% to 5 wt-%.

38. The mix of claim 37 wherein said protein source comprises caseinate in a concentration ranging from about 1.25 wt-% to 4 wt-%.

39. The mix of claim 33 additionally comprising an amount of emulsifier effective to reduce doughiness in the interior of the baked product and provide a crisp outer crust.

40. The mix of claim 39 wherein said emulsifying agent is selected from the group consisting of a monoglyceride of a fatty acid, a diglyceride of a fatty acid, propylene glycol, a mono ester of a fatty acid, a diester of a fatty acid, a glycerol ester of a fatty acid, a lactose ester of a fatty acid, an ethoxylated monoglyceride, an ethoxylated diglyceride, a succinylated monoglyceride, a succinylated diglyceride, lecithin, a diacetyl tartaric acid ester of a monoglyceride, a diacetyl tartaric acid ester of a diglyceride, a sucrose ester of glycerol, and mixtures thereof.

41. The mix of claim 40 wherein said emulsifying agent is present in a concentration ranging from about 0.7 to 1.2 wt-%.

42. The mix of claim 33 wherein said shortening is in the form of a chip having an area ranging from about 40 to 370 $mm^2$.

43. A dough resulting from the mix of claim 33.

44. A high fat dough for making a biscuit product, said dough comprising water, flour, a leavening agent, salt, an amount of protein source effective to provide the biscuit product with a crisp outer layer and a tender interior and a shortening constituent, wherein said shortening constituent comprises a shortening having a melting point of about 104° F., or less, an SFI profile which has a slope of about −0.9 or greater and is present in a concentration which provides the dough with uniform baking properties and composition.

45. The dough of claim 44 wherein said shortening is present in a concentration ranging from about 7 wt-% to 28 wt-%.

46. The dough of claim 45 wherein said shortening is present in a physical form selected from the group consisting of ribbons, chips, plasticized shortening, and mixtures thereof.

47. The dough of claim 46 wherein said shortening comprises chips having a thickness ranging from about 0.08 cm to 0.2 cm.

48. The dough of claim 44 wherein said protein source is present in a concentration ranging from about 0.5 wt-% to 4 wt-%.

49. The dough of claim 48 wherein said protein source comprises caseinate in a concentration ranging from about 1.5 wt-% to 3.5 wt-%.

50. The dough of claim 44 additionally comprising an amount of emulsifier effective to reduce doughiness in the interior of the biscuit product and provide a crisp outer crust.

51. The dough of claim 50 wherein said emulsifying agent is selected from the group consisting of a monoglyceride of a fatty acid, a diglyceride of a fatty acid, propylene glycol, a mono ester of a fatty acid, a diester of a fatty acid, a glycerol ester of a fatty acid, a lactose ester of a fatty acid, an ethoxylated monoglyceride, an ethoxylated diglyceride, a succinylated diglyceride, lecithin, a diacetyl tartaric acid ester of a monoglyceride, a diacetyl tartaric acid ester of a diglyceride, a sucrose ester of glycerol, and mixtures thereof.

52. The dough of claim 51 wherein said emulsifying agent is present in a concentration ranging from about 0.5 to 0.9 wt-%.

53. The dough of claim 44 wherein said shortening is in the form of a chip having an area ranging from about 40 to 370 $mm^2$.

54. A biscuit resulting from the dough of claim 44.

55. A high fat biscuit product, said biscuit product comprising flour, a leavening agent, salt, an amount of protein source effective to provide the biscuit product with a crisp outer layer and a tender interior and a shortening constituent, wherein said shortening constituent comprises a shortening having a melting point of about 104° F., or less, an SFI profile which has a slope of about −0.9 or greater and is present in a concentration which provides a biscuit product with uniform baking properties and composition.

56. The biscuit of claim 55 wherein said shortening is present in a concentration ranging from about 7 wt-% to 28 wt-%.

57. The biscuit of claim 56 wherein said shortening is present in a physical form selected from the group consisting of ribbons, chips, plasticized shortening, and mixtures thereof.

58. The biscuit of claim 55 wherein said protein source is present in a concentration ranging from about 0.5 wt-% to 4 wt-%.

59. The biscuit of claim 55 wherein said protein source comprises caseinate in a concentration ranging from about 1.5 wt-% to 3.5 wt-%.

60. The biscuit of claim 55 additionally comprising an amount of emulsifier effective to reduce doughiness in the interior of the baked product and provide a crisp outer crust.

61. The biscuit of claim 60 wherein said emulsifying agent is selected from the group consisting of a monoglyceride of a fatty acid, a diglyceride of a fatty acid, propylene glycol, a mono ester of a fatty acid, a diester of a fatty acid, a glycerol ester of a fatty acid, a lactose ester of a fatty acid, an ethoxylated monoglyceride, an ethoxylated diglyceride, a succinylated monoglyceride, a succinylated diglyceride, lecithin, a diacetyl tartaric acid ester of a monoglyceride, a diacetyl tartaric acid ester of a diglyceride, a sucrose ester of glycerol, and mixtures thereof.

62. The biscuit of claim 60 wherein said emulsifier is present in a concentration ranging from about 0.6 to 1.5 wt-%.

63. The biscuit of claim 62 wherein said shortening is in the form of a chip having an area ranging from about 40 to 370 $mm^2$.

64. A frozen biscuit dough composition comprising by weight:

a. from about 35 percent to about 60 wt-% farinaceous material;

b. from about 7 wt-% to about 28 wt-% shortening, wherein said shortening is comprised of from about 40 percent to about 100 percent shortening flakes, said shortening flakes having solids fat index values of about 61 at 50° F., about 48 at 70° F., about 39 at 80° F., about 16.5 at 92° F., and about 1.5 at 104° F.;

*c. from about 20 wt-% to about 40 wt-% liquids;*

*d. from about 1 wt-% to 4.5 wt-% leavening agent; and*

*e. from about 0.5 wt-% to 4 wt-% protein source.*

*65. The frozen biscuit dough composition of claim 64 additionally comprising from about 0.5 wt-% to 2 wt-% emulsifying agent.*

*66. The frozen biscuit dough composition of claim 64 wherein said shortening flakes have a melting point of about 104° F.*

*67. The frozen biscuit dough composition of claim 65 wherein said emulsifying agent comprises diaceryl tartaric acid esters of mono- and diglycerides.*

*68. The frozen biscuit dough composition of claim 64 wherein said shortening is comprised of about 100 percent shortening flakes.*

*69. The frozen biscuit dough composition of claim 68 wherein said shortening is in the form of a chip having an area ranging from about 40 to 370 $mm^2$.*

* * * * *